United States Patent [19]

Daubin et al.

[11] Patent Number: 4,831,874

[45] Date of Patent: May 23, 1989

[54] PARADAC WIND MEASUREMENT SYSTEM

[75] Inventors: Scott C. Daubin, Key Biscayne; Thomas L. Clarke, Miami, both of Fla.

[73] Assignee: Daubin Systems Corporation, Key Biscayne, Fla.

[21] Appl. No.: 109,997

[22] Filed: Oct. 16, 1987

[51] Int. Cl.$^4$ ............................................. G01W 1/02
[52] U.S. Cl. .................................. 73/189; 73/170 R; 367/92
[58] Field of Search ................ 73/189, 170 R, 861.25; 367/87, 90, 92

[56] References Cited

U.S. PATENT DOCUMENTS

| | | | |
|---|---|---|---|
| 3,379,060 | 4/1968 | Pear, Jr. | 73/189 |
| 3,613,069 | 10/1971 | Cary, Jr. | 367/92 |
| 3,693,433 | 9/1972 | Kobori et al. | 73/189 |
| 3,889,533 | 6/1975 | Balser | 73/189 |
| 4,143,547 | 3/1979 | Balser | 73/170 R |
| 4,174,630 | 11/1979 | Nicoli | 73/189 X |
| 4,206,639 | 6/1980 | Balser | 73/189 |
| 4,219,887 | 8/1980 | MacCready, Jr. | 73/189 X |
| 4,351,188 | 9/1982 | Fukushima et al. | 73/189 |
| 4,481,517 | 11/1984 | Brown | 73/170 R X |
| 4,558,594 | 12/1985 | Balser et al. | 73/189 |
| 4,573,352 | 3/1986 | Hurtig et al. | 73/189 |

OTHER PUBLICATIONS

"Fundamentals of Sonar", J. Warren Horton, vol. 3, U.S. Navy Underwater Sound Laboratory, New London, CT (1955).
Little, Gordon, "Prospects for Acoustic Echo Sounding" Chapter 19 of Remote Sensing of the Troposphere, (1972).
Urich, Robert J., "Principles of Underwater Sound," McGraw-Hill (1975).
Neff, William D., "Quantitative Evaluation of Acoustic Echoes from the Planetary Boundary Layers," NOAA TR 332-WPL 38 (1975).
Clay, Clarence & H. Medwin, "Acoustic Oceanography: Principles & Applications," Wiley-Interscience (1977).
Dixon, Robert C., "Spread Spectrum Systems," Wiley, New York, (1976) pp. 53–91.
Simpson, Michael R., "Evaluation of a Vessel-Mounted Acoustic Doppler Current Profiler for Use in Rivers & Estuaries", pp. 106–109.

Primary Examiner—Charles A. Ruehl
Attorney, Agent, or Firm—Harold Gell

[57] ABSTRACT

This invention relates to a parametric source Doppler acoustic wind profiler for measuring atmospheric wind conditions. It includes a parametric acoustic source excited by a transmitter generating a pair of primary frequencies and radiates an intermodulation difference frequency. Echoes of the difference frequency are produced by wind induced scatter at the difference frequency which is significantly lower than the transmitted primary frequencies and detected by a single microphone or an array of microphones.

35 Claims, 14 Drawing Sheets

PARADAC WIND MEASUREMENT SYSTEM

TECHNICAL FIELD

This invention relates to a parametric source Doppler acoustic wind profiler for measuring atmospheric wind conditions. It includes a parametric acoustic source excited by a transmitter generating a pair of primary frequencies and radiates an intermodulation difference frequency. Echoes of the difference frequency are produced by wind induced scatter at the difference frequency which is significantly lower than the transmitted primary frequencies and detected by a single microphone or an array of microphones.

BACKGROUND OF THE INVENTION

The remote measurement of atmospheric wind profiles to provide instantaneous and trend data has become a requirement of paramount importance at the major airports of the world. This need for wind profile data has been tragically demonstrated by numerous aviation disasters caused by wind anomalies such as wind shear resulting from weather related phenomena or vortices created by heavy aircraft.

Attempts have been made to provide instantaneous wind profile data but they require systems which are complex, costly and inaccurate or impractical. Doppler radar is one such system; another solution lies in the application of electro-acoustic techniques which involve transmitting an acoustic signal and detecting scatter echoes resulting from wind movements in a narrow zone. Such a system, using sound as the energy probe, has been termed "sodar". Since the propagation speed of radar waves is approximately 882,000 times that of sound waves, using sodar, it is considerably less difficult to achieve the required high resolution than using radar. Consequently, a high resolution Doppler radar for local wind shear monitoring would tend to be significantly more expensive than a sodar system for the same purpose.

C. Pear, Jr., U.S. Pat. No. 3,379,060 for "Wind Meter" issued Apr. 23, 1968 is an early example of the use of sonic transmission to determine wind velocity. In systems such as this, a single transducer or loudspeaker radiates sonic energy which is detected by a plurality of microphones arranged in a radial pattern. Differences in the received energy at each microphone are evaluated to determine wind flow velocity and direction. This system is not capable of detecting a vertical wind profile. It determines only wind parameters within the flow encompassing the loudspeaker and microphones.

J. Nicoli, U.S. Pat. No. 4,174,630 for "Ultrasonic Anemometer" and Y. Kobori et al, U.S. Pat. No. 3,693,433 for "Ultrasonic Anemometer" are similar to the Pear, Jr. system in that sonic transmitters radiate energy toward receivers and the effect of wind flow through the transmission path is analyzed to provide the wind parameter data.

The early ultrasonic anemometers were improved by using echo techniques in the sonic band. One family of devices using this approach was developed by Martin Balser. It is the subject of U.S. Pat. Nos.: 3,889,533 for "Acoustic Wind Sensor"; 4,143,547 for "Method And Apparatus For Remote Measurement Of Variation In Wind Velocity"; 4,206,639 for "Doppler Acoustic Wind Sensor; and 4,558,594 for "Phased Array Acoustic Antenna". These patents illustrate a system for remote measurement of wind velocity which include an array of acoustic transducer elements adapted to provide a beam of acoustic energy along a path and detect the acoustic energy that has been scattered by the wind in the beam path. The systems require a complex switching scheme to alternately connect the transducers between the transmitter and receiver portions of a system.

P. MacCready, Jr., U.S. Pat. No. 4,219,887 for "Bistatic Acoustic Wind Monitor System" and E. Brown, U.S. Pat. No. 4,481,517 for "Echometry Device And Method" illustrate further improvements. In these systems, an acoustic pulse is transmitted from the ground upwards along a beam path and a transmitter receives echoes resulting from atmospheric scatter along a second path. In MacCready, the transmission beam is vertical and the reception path is at an angle to the vertical while Brown illustrates a system where the transmission path is at an angle to the vertical and the receiver path is vertical. The Brown system is utilized to detect temperature variations rather than wind profile velocities.

M. Hurtig et al, U.S. Pat. No. 4,573,352 for "Apparatus For Measuring Wind Speed And/Or Direction" issued March 4, 1986 discloses a three beam approach to determining wind profile data. The system incorporates three separate transducers and associated parabolic reflectors to create three beams.

A system whose signal generation is based on the principles of linear acoustics, as do all of the patent references cited above, faces an unsatisfying engineering compromise in the choice of operating frequency. Attenuation of acoustic energy propagating in the atmosphere varies approximately as the square of the frequency. Therefore, for penetration (maximum range or maximum height) in excess of a few hundred meters, it is necessary to use a low acoustic frequency. But, as the frequency decreases, the wavelength increases and the atmosphere becomes more transparent to the acoustic energy. Of greater significance, in order to achieve adequate spatial resolution, it is necessary to produce a sharp beam (typically on the order of 10 degrees or less in width) and this requires that the linear acoustic array be many wavelengths in diameter (7 wavelengths for a 10 degree beamwidth). Thus, a linear acoustic source array with a sharp beam can become ungainly in size, for example, a system operating at 500 Hz with a 10 degree beamwidth, would have an array diameter of 4.7 meters (15.4 feet). Because of this, most acoustic sounding systems have an operating frequency above 1 kHz. For these reasons, acoustic systems which can measure wind profiles to heights of several kilometers are not likely to be based on linear acoustical principles. However, a system based on the generation of sound by the principles of non-linear acoustics, can achieve simultaneously a sharp beam and deep penetration. Such a system will be described below.

M. Fukushima et al, U.S. Pat. No. 4,351,188 for "Method And Apparatus For Remote Measurement Of Wind Direction And Speed In The Atmosphere" is exemplary of systems for determining wind profile which utilize a combination of acoustic transmitters and radio wave transmitter and receivers. Systems such as this produce accurate wind profile data but are extremely complex and difficult to implement in the environment of most modern major airports.

The system unfolded by the specification and drawing of this patent and defined by the claims presented herein are structured around certain physical truths or principles which are presented in the following references.
1. Horton, J. Warren, "Fundamentals of Sonar," Vol. 3, U.S. Navy Underwater Sound Laboratory, New London, Conn. (1955).
2. Little, C. G., et al, "Remote Sensing of Wind Profiles in the Boundary Layer," ESSA/U.S. Dept. of Commerce, ESSA TR ERL 168-WPL 12 (1970).
3. Little, C. Gordon, "Prospects for Acoustic Echo Sounding" Chapter 19 of "Remote Sensing of the Troposphere," (V. E. Derr, Ed.), NOAA/U.S. Dept. of Commerce & Wave Propagation Laboratory/Univ. of Colo. (1972).
4. Urick, Robert J., "Principles of Underwater Sound," McGraw-Hill (1975).
5. Neff, William D., "Quantitative Evaluation of Acoustic Echoes from the Planetary Boundary Layer," NOAA/U.S. Dept. of Commerce, NOAA TR 332-WPL 38 (1975).
6. MacWilliams, F. J. & N. J. A. Sloane, "Psuedo-Random Sequences & Arrays," Proc. IEEE 64 (1976) pp. 1715–1729.
7. Clay, Clarence S. & H. Medwin, "Acoustical Oceanography: Principles & Applications," Wiley-Interscience (1977).
8. Dixon, Robert C., "Spread Spectrum Systems," Wiley, N.Y. (1976) pp. 53–91

The preceding publications are incorporated herein by reference and cited throughout the specification to precisely relate their teachings to the present invention.

OBJECTIVES OF THE INVENTION

In view of the shortcomings of the known prior attempts to provide remote measurement of atmospheric wind profiles, a primary objective of the present invention is to provide a wind profiler incorporating parametric source intermodulation techniques and Doppler analysis of wind scatter induced returned energy.

Another objective of the present invention is to provide a wind profiler incorporating the transmission, reception and correlation processing of pseudo-random pulse sequences in order to increase the signal to noise ratio, and hence the maximum operating range, and at the same time preserve a high degree of spatial resolution.

Another objective of the present invention is to provide a meteorological system adaptable to monitor wind turbulence such as microbursts and wing tip vortices or as a wind profiler providing wind vector versus height and turbulence spectra versus height.

Another objective of the present invention is provide a remote wind profiler incorporating a directional parametric source that may be physically or electronically aimed to provide data relative to a region defined by one or more narrow radiation beams.

A still further objective of the present invention is to provide a directional remote wind profile determining apparatus as a passive vehicle detection system where the path of the vehicle is determined as a function of turbulence created by air flow over the vehicle.

Another objective of the present invention is to provide a phased planar array of acoustic projectors positioned in front of a parabolic receiving reflector whose focal plane includes a plurality of microphones positioned to be responsive to a particular beam path.

Another objective of the invention is to provide for phase shifting and/or summing the signals from the receiving microphones on the focal plane of the parabolic dish in order to improve the signal to noise ratio of the received energy.

A still further objective of the present invention is to provide a microprocessor controlled acoustic projector utilizing a parametric array of transducers driven to create an intermodulated signal substantially lower in frequency than the projector driving frequencies.

Another objective of the present invention is to provide a plurality of acoustic detectors arranged in the focal plane of a parabolic reflector and individually selectable by a microprocessor controlled system for producing an output signal representative of a selected beam direction.

A still further objective of the present invention is to provide a plurality of bandpass filters to isolate selected components of the received signal and noise, a means to convert the selected analog components to digital data and process the digital data to provide wind profile and signal to noise ratio data.

SUMMARY OF THE INVENTION

The PARametric Array Doppler ACoustic wind profiler (PARADAC) uses the non-linear acoustic interaction between two high level, primary frequencies acoustic signals to generate lower frequency signals at the difference frequency which propagate through the atmosphere and interact with the winds. (The primary frequencies are necessarily higher than the secondary, or difference, frequency; however the magnitude of the primary frequencies may vary from the sonic to the ultrasonic range.) This type of interaction is commonly referred to as a "parametric source", or "virtual end-fire array" and described in detail in "Principles of Underwater Sound,"pp. 76–79 by Robert J. urick, in McGraw-Hill (1975) and "Acoustical Oceanography: Principles & Applications," pp. 395–404 by Clarence Clay and H. Medwin, in Wiley-Interscience (1977).

The beam pattern of the low frequency propagated signal is much sharper than would be obtained from a linear acoustic source array of the same transverse dimensions and it is free of side lobes.

The system generates a sharp beam at a low frequency. This results in high spatial resolution and long maximum ranges (heights) of operation. A comparison of the performance parameters of the preferred embodiment of the PARADAC system, as shown in Table 1 to the performance obtainable with a system based on a linear acoustic source array as presented in "Prospects for Acoustic Echo Sounding," Chapter 19 of "Remote Sensing of the Troposphere," (V. E. Derr, Ed.), NOAA/U.S. Dept. of Commerce & Wave Propagation Laboratory/Univ. of Colorado (1972) by Gordon C. Little clearly indicates that a linear acoustic source array is inferior. A linear array of the same transversal dimensions as a PARADAC system cannot achieve comparable performance.

TABLE 1

| PARADAC PERFORMANCE PARAMETERS | | |
|---|---|---|
| | Low Regime | High Regime |
| Parameters for All Beams: | | |
| Minimum Height (m) | 34 | 552 |
| Maximum Height (m) | 586 | 3,312 |
| Number of Range Gates | 160 | 160 |
| Resolution, | | |
| minimum (m) | 4.87 | 29.40 |
| maximum (m) | 29.80 | 154.08 |
| Pulse Length (msec) | 20 | 100 |
| Sequence Length | 1 | 32 |

TABLE 1-continued
PARADAC PERFORMANCE PARAMETERS

| | Low Regime | High Regime |
|---|---|---|
| Repetition Interval (sec) | 3.20 | 18.20 |
| Nominal Sound Speed (m/sec) | 345 | 345 |
| Number of Velocity Cells per Gate | 130 | 130 |
| Horizontal Wind Speed, | | |
| maximum (knots) | 130 | 130 |
| resolution (knots) | 1 | 1 |
| Parameters for Canted Beams: | | |
| Vertical Angle (decrees) | 12.4 | 12.4 |
| Maximum Radial Velocity (m/sec) | 17.3 | 17.3 |
| Radial Spectral Resolution (m/sec) | 0.11 | 0.11 |
| Parameters for Vertical Beam: | | |
| Vertical Angle (degrees) | 0 | 0 |
| Maximum Vertical Velocity (m/sec) | 14.36 | 14.36 |
| Vertical Spectral Resolution (m/sec) | 0.11 | 0.11 |

The PARADAC system uses:

A phased, planar array of primary frequency acoustic projectors located ahead of, and coaxial to, a parabolic receiving reflector, at whose focal plane are located microphones associated with each of the projected beam directions.

Improved operating efficiency and enhanced signal to noise ratio are obtained through coherent demodulation and the use of pseudo-random sequences to increase maximum range (height) of operation.

Coherent demodulation is a method of deriving the Doppler signal at a given range bin (height) in an efficient manner, yielding directly both the significant Doppler (wind) at that height or, if needed, the complete Doppler (turbulence) spectrum.

Pseudo-random sequences improve the signal to noise ratio and at the same time preserve the fine range resolution of short pulses, when operating in the "high regime" (above 500 meters), the PARADAC system transmits energy in coded, psuedo-random sequences to achieve the benefits described in "Spread Spectrum Systems," by Robert C. Dixon, pp. 53–91, Wiley, N.Y. (1976).

The PARADAC wind measurement system is a meteorological instrument system which may be used as a monitor for microbursts and other forms of turbulence (such as tip vortex turbulence) at airports, or as a wind profiler whose outputs are the mean wind vector versus height and the turbulence spectra versus height. The system is easily converted from one application to the other because the physical differences reside in different orientations of the array and the electronic differences consist of different manipulation of the array data by the microprocessor and control program.

DESCRIPTION OF THE INVENTION a. General Arrangement

Figure 1:
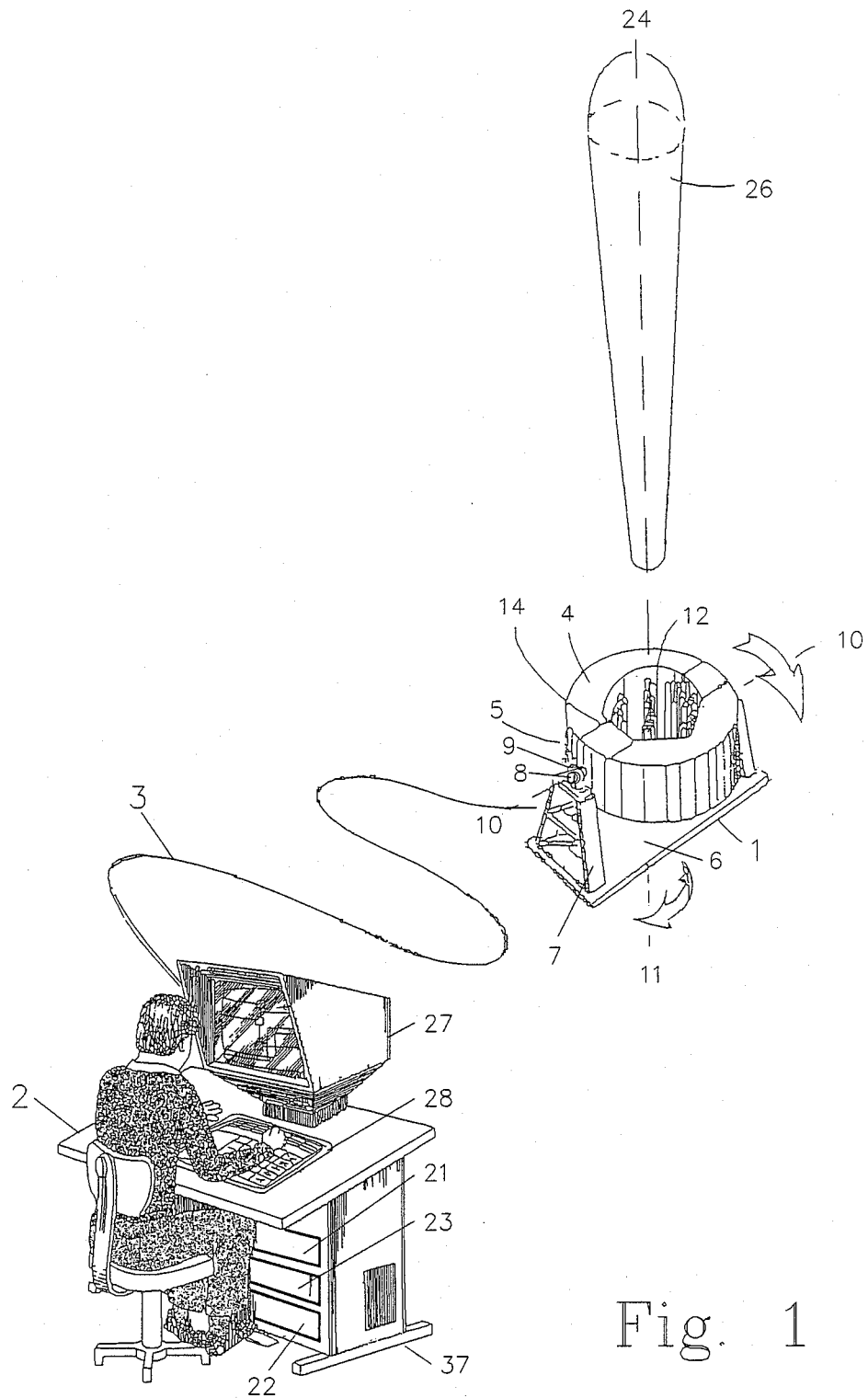
FIG. 1 shows the assembled PARADAC system, operating as a wind profiler, with the axial beam directed vertically.

FIG. 1 is an exemplary PARADAC system illustrating the interconnection of one antenna array assembly and one control subsystem. Configurations including multiple antenna array assemblies connected to one or more consoles are usually deployed. However, for simplicity FIG. 1 illustrates a single antenna array assembly 1 connected via main cable assembly 3 to a single console 2.

Major components of antenna array assembly 1 include array assembly foundation 6 which supports skirt 5, parabolic dish 4, projector array 12 and receiver array 15, together with associated parts and components which will be further described below. Antenna array assembly 1 can be rotated about horizontal axis 10, which is defined by journals 8, contained in bearings 9 which are mounted on pedestals 7. In other configuration options, antenna array assembly 1 is rotatable about vertical axis 11. The mechanisms to accomplish this rotation are not shown, as they are not essential to an understanding of the principles and operation of the PARADAC system.

Figure 2:
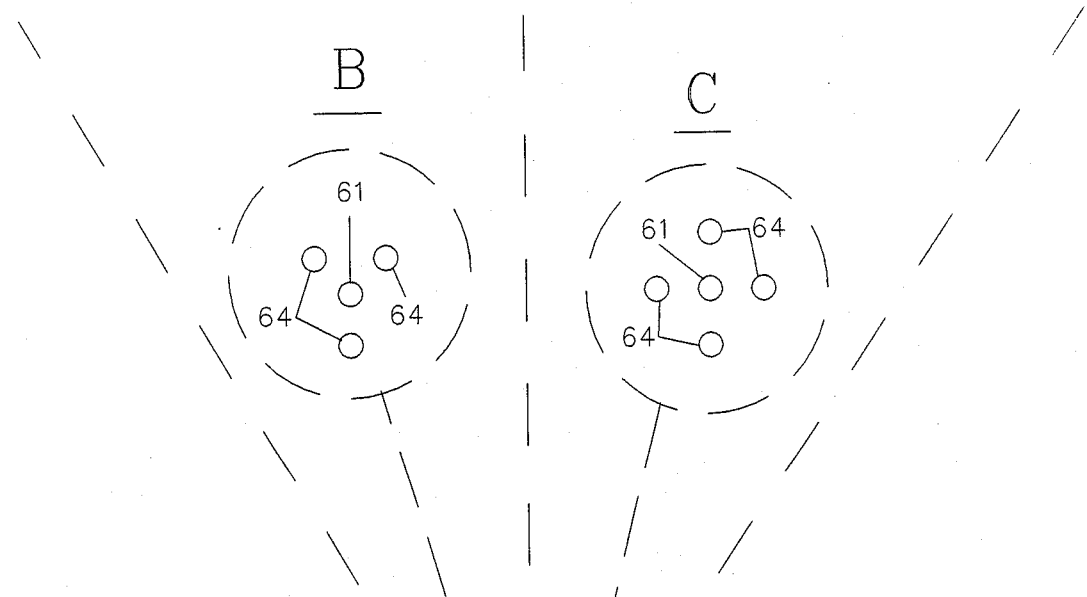
FIG. 2a shows the details of an axial section through the array assembly.
FIGS. 2b and 2c illustrate the geometrical arrangement of typical receiver array elements.
Figure 3:
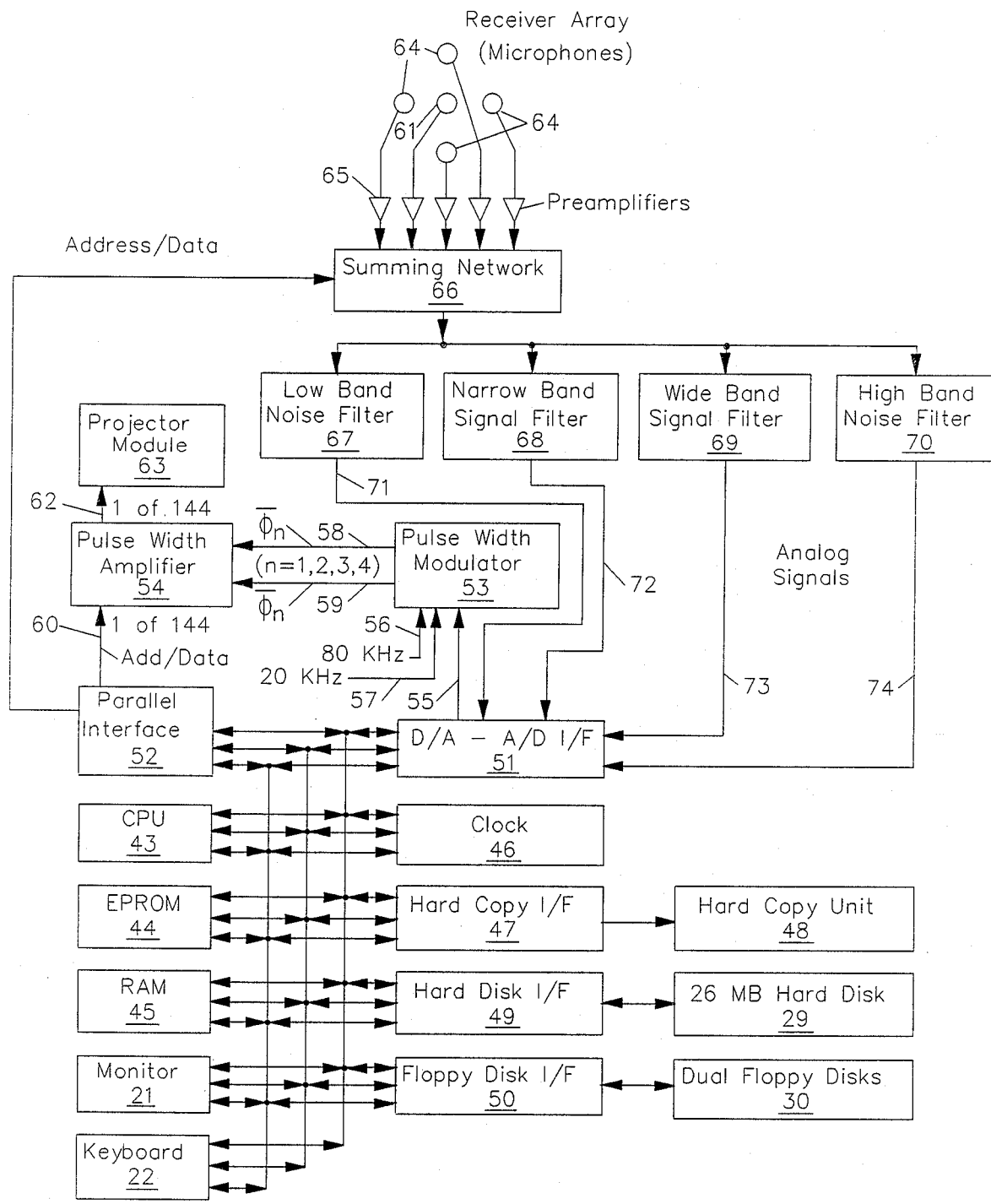
FIG. 3 is a block diagram of the electronics system

A picture of the internal structure array assembly 1 is given by FIG. 2a. Projector array 12, consisting of a multiplicity of high frequency acoustic transducers (not shown) mounted on the upper face of projector array housing 13, is tied to array assembly 1 via projector array supports 14, so that the plane of projector array 12 is normal to the axis of parabolic dish 4. The function of projector array 12 is to generate narrow beams of high frequency acoustic energy of different frequencies which interact in the space above projector array 12, as described in the text below, to generate, via the processes of non-linear acoustics, the low frequency difference frequency which propagates to heights of several kilometers in the atmosphere. FIG. 1 shows an example of a "normal" beam, that is, a beam whose beam pattern 26 is axially symmetric to normal beam axis 24. (Beam pattern 26 shows the relative directional intensity of transmitted sound; normal beam axis 24 coincides with the axis of parabolic dish 4.) It is also essential that projector array 12 produce beams whose axes are disposed at an angle to normal beam axis 24. Such a canted beam axis 25 is illustrated in FIG. 2a. These canted beams are produced by phasing the various groups of transducers in projector array 12 with respect to one another in a process known as "electrical steering." Ref. (1), pages 5A-1 through 5A-23, which dates from 1955, describes this well-documented process for sonar systems. Another description of the array steering process in acoustical systems is contained in pages 155-157 of ref. (7). The hexagonal geometric projector array 12, shown in FIG. 1, when properly phased, produces sequentially three canted beam axes 25 whose projections are disposed symmetrically at relative angles of 120 degrees in the plane normal to normal beam axis 24. These three, together with normal beam axis 24, constitute four beams through which the PARADAC system probes the atmosphere. There are a number of other optional geometric shapes for projector array 12. In particular, one of these geometries produces four canted beam axes, whose projections in the plane normal to normal beam axis 24, are disposed at relative angles of 0, 90 180 and 270 degrees. Such a configuration is known as the "Janus" configuration. These four, together with normal beam axis 24, constitute five beams for this optional configuration.

Structural rigidity of array assembly 1 and the provision a drip tight enclosure is provided by bonding parabolic dish 4 to skirt 5. Drain pipe 17 permits drainage of rain water and condensation which may collect in parabolic dish 4 and also as an access to run array cable conduit 16 from projector array housing 13 to array assembly enclosed volume 39.

FIG. 2a illustrates the mounting of receiver array 15 on the focal plane 38 of parabolic dish 4. Receiver array 15 consists of axial beam microphone 61 and a number of canted beam microphones 64 equal to the number of canted beams producible by projector array 12 and defined by canted beam axes 25. Two typical microphone arrangements, as seen in focal plane 38 of parabolic dish 4, are shown in panels (b) and (c) of FIG. 2a. Cabling from receiver array 15 joins that from projector array 12 and runs from projector array housing 13 to enclosed volume 39 via array cable conduit 16. Within enclosed volume 39, the transmitting electronics are contained in four pulse width modulator/amplifier (PWM/A) enclosures 18 and the first stage of the receiving electronics are contained within microphone preamplifier enclosure 19. Power for the transmitting electronics is provided by storage batteries 20, also located within enclosed volume 39.

Operating console assembly 2 is the station from which the operator controls and monitors the PARADAC system. The operator sends commands and information to the system via keyboard 28 and receives information from the system via monitor 27. Located in operating console assembly 2 are the main computer system (in main computer enclosure 27), the second and third stages of the receiving electronics (in receiving electronics enclosure 23) and the logic and transmitting array power supplies (in power supply enclosure 22). Operating console 2 is portable by virtue of casters 37.

b. Electronics System

An understanding of the operation of the signal generating, receiving, analysis and display system may be gained through a study of the following exemplary embodiment in combination with FIGS. 3, 4, 5, 10, 11 and 12 and the PARADAC system main program and subroutines of Appendix A. This embodiment is presented to simplify the system explanation and is not to be considered as limiting the invention to the specific hardware. It is anticipated that implementation through new or different hardware is within the scope of the invention as defined by the claims. The system elements, tied directly to data bus 40, address bus 41 and control bus 42, constitute the main computer system which is located in operating console assembly 2. A multiplicity of pulse width modulators 53, pulse width amplifiers 54 and projector modules 63, one receiver array 15 canted beam microphones 64, together with one microphone preamplifier for each microphone of receiver array 15 are located in array assembly 1. The main computer, consisting of CPU 43, EPROM 44, RAM 45, clock 46, floppy disk 30 (via floppy disk I/F unit 50), and to those system elements described above as located in array assembly 1 via a parallel I/F unit 52 (for digital command and control) and a digital to analog and analog to digital (D/A-A/D) converter I/F unit 51 (for analog-digital interactions).

Figure 4:
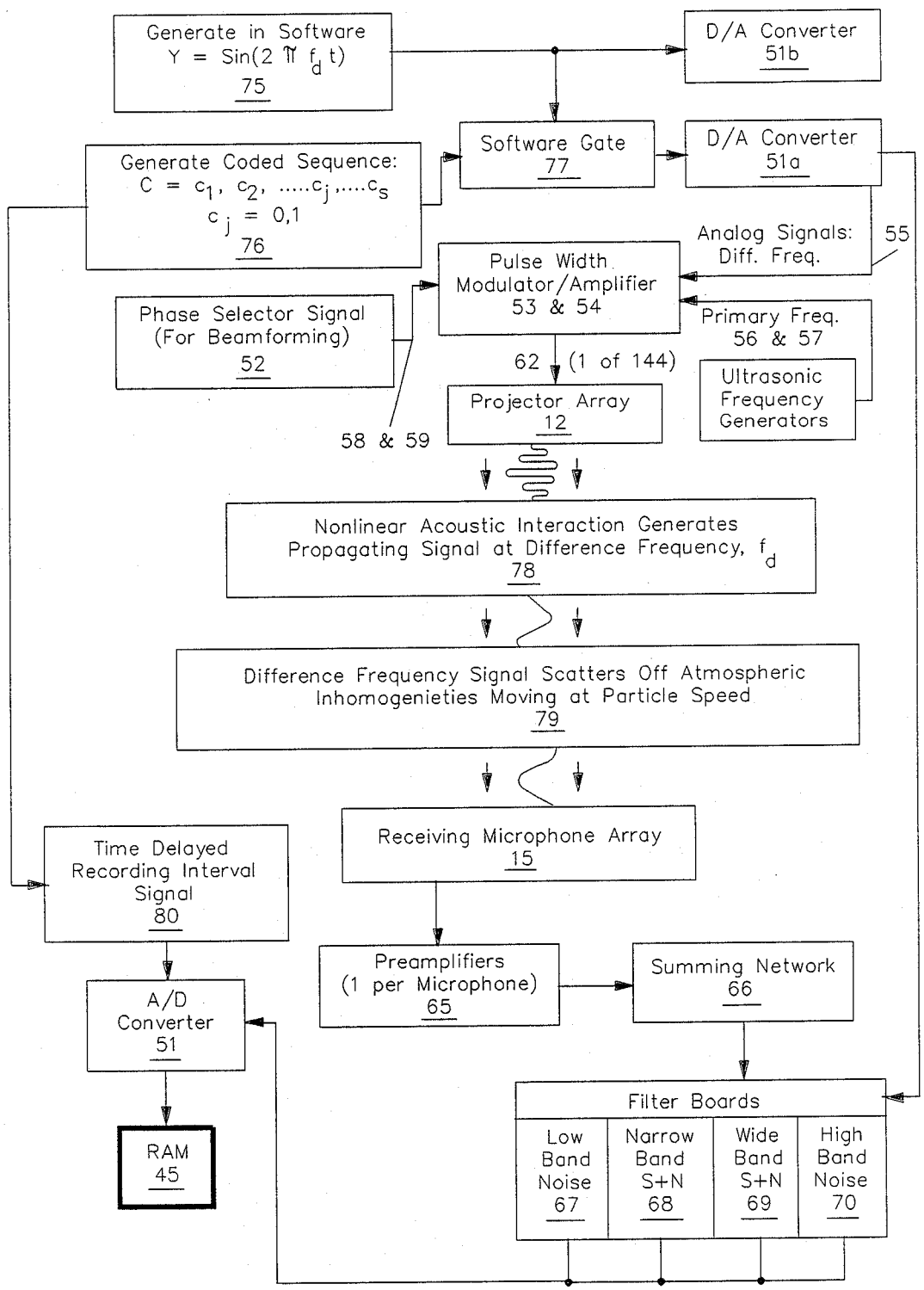
FIG. 4 shows the processes flow in software and hardware for signal generation and reception.

The operation of this system is illustrated in FIG. 4. The computer generates a sine wave at the difference frequency in software 75. It also generates in software a coded sequence 76 [also known as a "pseudo-random sequence"; see ref.(6)] This coded sequence may be looked upon as a series of 1's and 0's, e.g., 1001110010110010, whose sequential arrangement is random, but whose average number are approximately equal. Coded sequences provide a means of increasing the signal to noise ratio of the processed received signals. They are used only where the maximum height is such that this enhancement may be needed; this is typically found in the high regime as defined in Table 1. Where the coded sequence is not used, as in the low regime of Table 1, the entire process of block 76 may be considered to be a 1. In block 77, the software generated sine wave is gated by the coded sequence. The output of block 77 is a digital signal train defining a sine wave, randomly turned "on" and "off". This is turned into a randomly interrupted analog signal at one D/A converter section 51a. Another, uninterrupted continuous signal is produced by a second D/A converter section 51b, for use in establishing a precise center frequency for operation of the filter bank 67, 68, 69 and 70, in the third stage of the receiving electronics. The randomly interrupted analog signal 55 enters pulse width modulator 53, together with two reference ultrasonic frequencies 56 and 57, one of which is one fourth of the other and may be derived from the other. The output of the pulse width modulator 53 is a train of positive and negative rectangular waves on lines 58 and 59 respectively to control the "on" and "off" intervals of pulse width amplifier 54 in accordance with the amplitude of input analog signal 55. Physically there are four pairs of lines 58 and 59. Each pair is associated with one of four phases at the mean primary frequency. Only one of these phases is applied to any given pulse with amplifier 54 at any time in accordance with a digital signal provided by the parallel I/F unit 52. For the transmitting projector modules 63 provides the electrical steering discussed above for generating the canted beams of energy, defined by canted beam axes 25.

Projector array 12 emits energy in a narrow beam directed along one of the canted beam axes 25 or the normal beam axis 24. This high frequency acoustic energy is generated in two narrow lines separated by a low frequency difference of less than 200 Hz in the preferred embodiment. For example, the primary frequencies might be 19.75 kHz and 20.25 kHz, which would result in a difference frequency of 500 Hz. In the region near the array, out to a distance where the natural attenuation of high frequency acoustic (primary)

energy reduces the intensity level below a critical point, the acoustic interaction takes place, block 78; beyond this region, only the low difference frequency propagates outward whatever beam axis is chosen. The difference frequency scatters off atmospheric inhomogenieties, whose motion the wind field, block 79. A small part of the at the difference frequency returns to array assembly 1. This back scattered energy, whose Doppler defines the wind at the scattering volume, is focussed by parabolic dish 4 receiver array 15, consisting of a microphone 64 or 61 the case of the normal beam axis. Since the size of the at the difference frequency is large with respect to the separation of microphones 61 and 64, all of the microphones of receiving array respond to some degree to the scattered signal, whatever its outgoing beam direction might have been. Therefore, to improve signal to noise ratio of the received energy, the output of each microphone passes through a preamplifier 65 and then all are summed, with suitable phase corrections, in summing network 66.

Next the (wide band) output of summing network 66, which consists of signal plus noise, is filtered in four band pass filters. Two of these filters, 67 and 70, process noise bands which are respectively below and above the signal band for the purpose of measuring the ambient background noise and then estimating the noise power in the signal band. The remaining two filters are in the signal band. Band pass filter is a "wide band" filter for use with the system's short (20 millisecond) pulse mode and band pass filter 68 is a "narrow band" filter for use with the system's long (100 millisecond) pulse mode. Furthermore, use of both narrow and wide band filters in the signal band provides an internal consistency check on the data by removing the chance of a spectral artifact being mistaken for real data.

The four analog outputs of the filter bank 71, 71, 73 and 74 are converted to digital data in A/D converter 51, which starts processing on receipt of enable signal 81, given after computer generated time delay 80, which is set to permit passage of the outgoing pulse prior to recording. The output data stream from A/D converter 51 proceeds over data bus 40 and is recorded in RAM 45.

c. Acoustic Interaction

Figure 10:
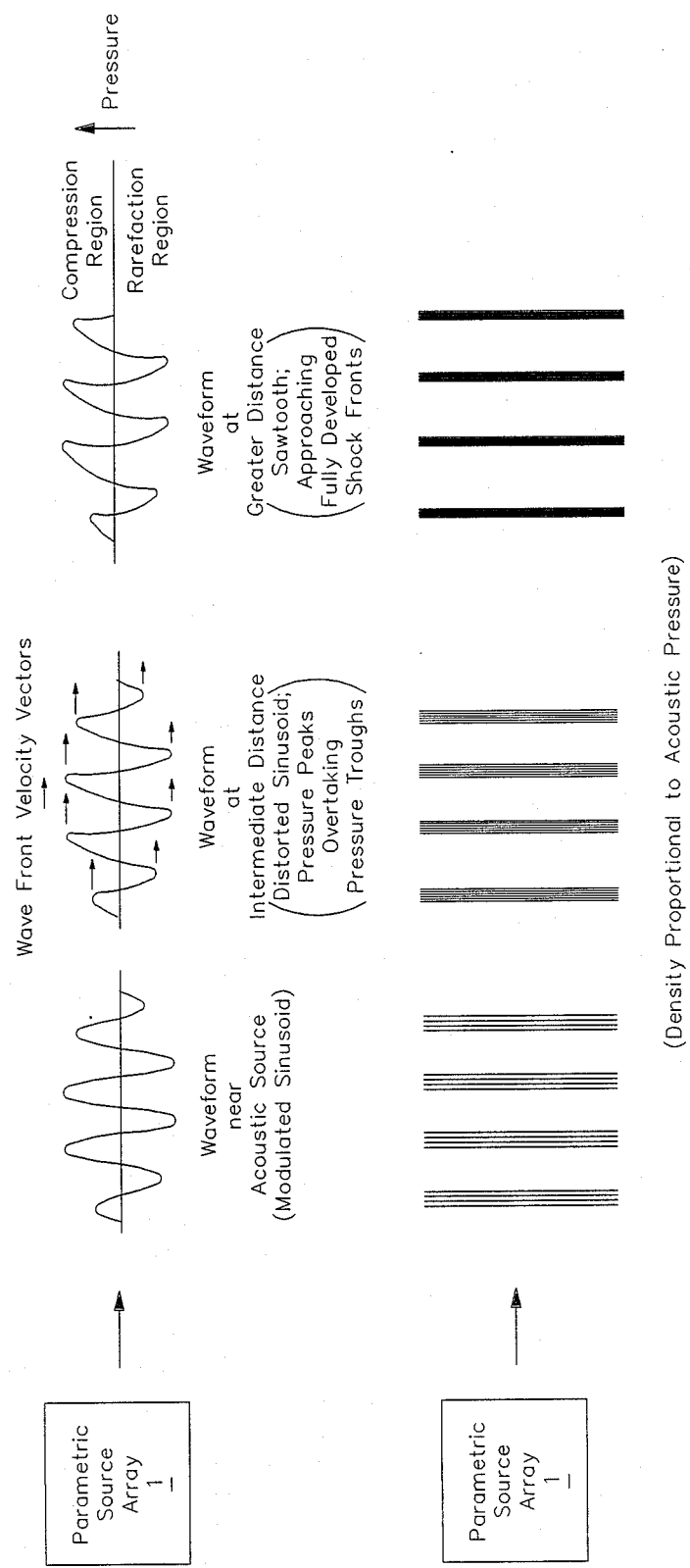
FIG. 10 illustrates non-linear acoustic signal generation
Figure 11:
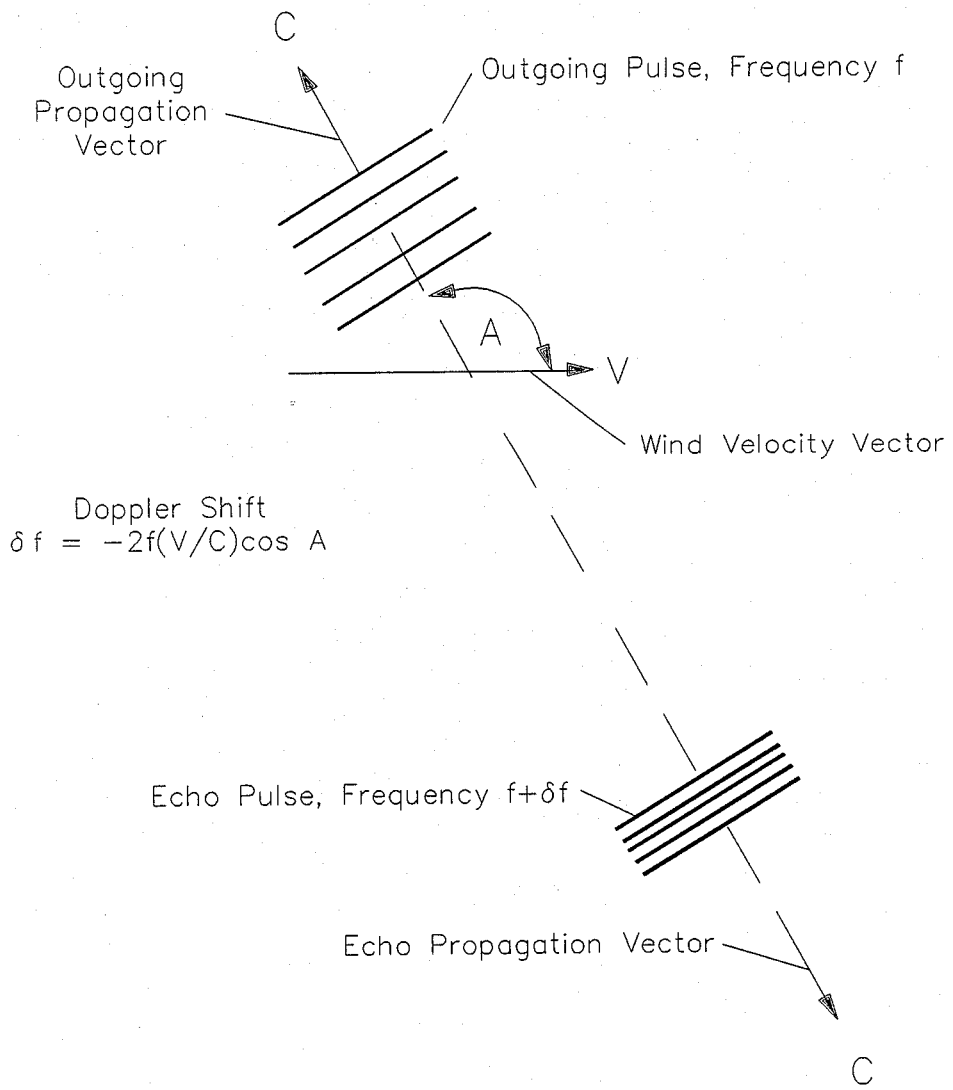
FIG. 11 shows the geometry of Doppler echo formation.

Generation of the low frequency (typically, 500 Hz) difference signal is depicted in FIG. 10. If the primary (high acoustic frequency) signal is large in amplitude, the pressure peaks will travel faster than the negative troughs, resulting in a distortion of the waveform from a sine to a sawtooth as the signal propagates away from the source [ref. (7), pp. 395–404], as shown in the figure. If the signal is amplitude modulated, the intensities of the developing shock waves are also modulated in the same pattern. Due to the non-linearity of the interaction, there are now propagating in the near field of projector array 12, signals at the primary high acoustic frequencies and at the difference (modulating) frequency. The high absorption of the high acoustic frequencies quickly removes these from the propagating signal, leaving only the difference frequency. This is the principle of the parametric source, or "virtual end fire array" [ref. (4), pp. 76–79; ref. (7), pp. 162–170]. The beam pattern of the parametric array is both narrow and free of side lobes [ref. (7), p. 166]. If the beamwidth at the difference frequency is expressed by phi, then:

$$\text{phi} = 4\text{SQRT}(\text{alphae}/kd) \text{ radians} \quad (1)$$

where

"SQRT" means "the square root of", alphae is the mean acoustic attenuation factor of the primary frequencies in nepers/meter, and kd is the wavenumber at the difference frequency in inverse meters.

This relation shows that the beamwidth of the parametric source is independent of array diameter, as contrasted to a linear source, in which beamwidth varies directly with array diameter. It is this feature of the parametric array, together with the absence of side lobes, which recommend its use in the applications defined in Sect. 2 above. With a very small array aperture (e.g. about 1 meter diameter), the PARADAC system is able to project a narrow beam of low frequency (e.g., 500 Hz) sound into the atmosphere with a beamwidth of about 10 degrees. A system operating in the linear acoustic regime at the same low frequency of 500 Hz would require an array diameter of 4.75 meters to produce the same 10 degree beamwidth. Thus, the PARADAC system achieves an increase in size efficiency of 475% over a linear system.

The low frequency propagating signal scatter from atmospheric inhomogenieties and returns an echo along the reverse path, which is detected, processed and stored in the PARADAC system, as described above. If the atmosphere is in motion, the echo contains a Doppler signal, whose frequency difference, fd, is given by:

$$fd = 2f(v/c)\cos A \quad (2)$$

where f is the frequency of the incident wave, v is the magnitude of the wind velocity, c is the speed of sound at the scattering site and A is the included angle between the outgoing propagation vector and the wind velocity vector.

Figure 9:
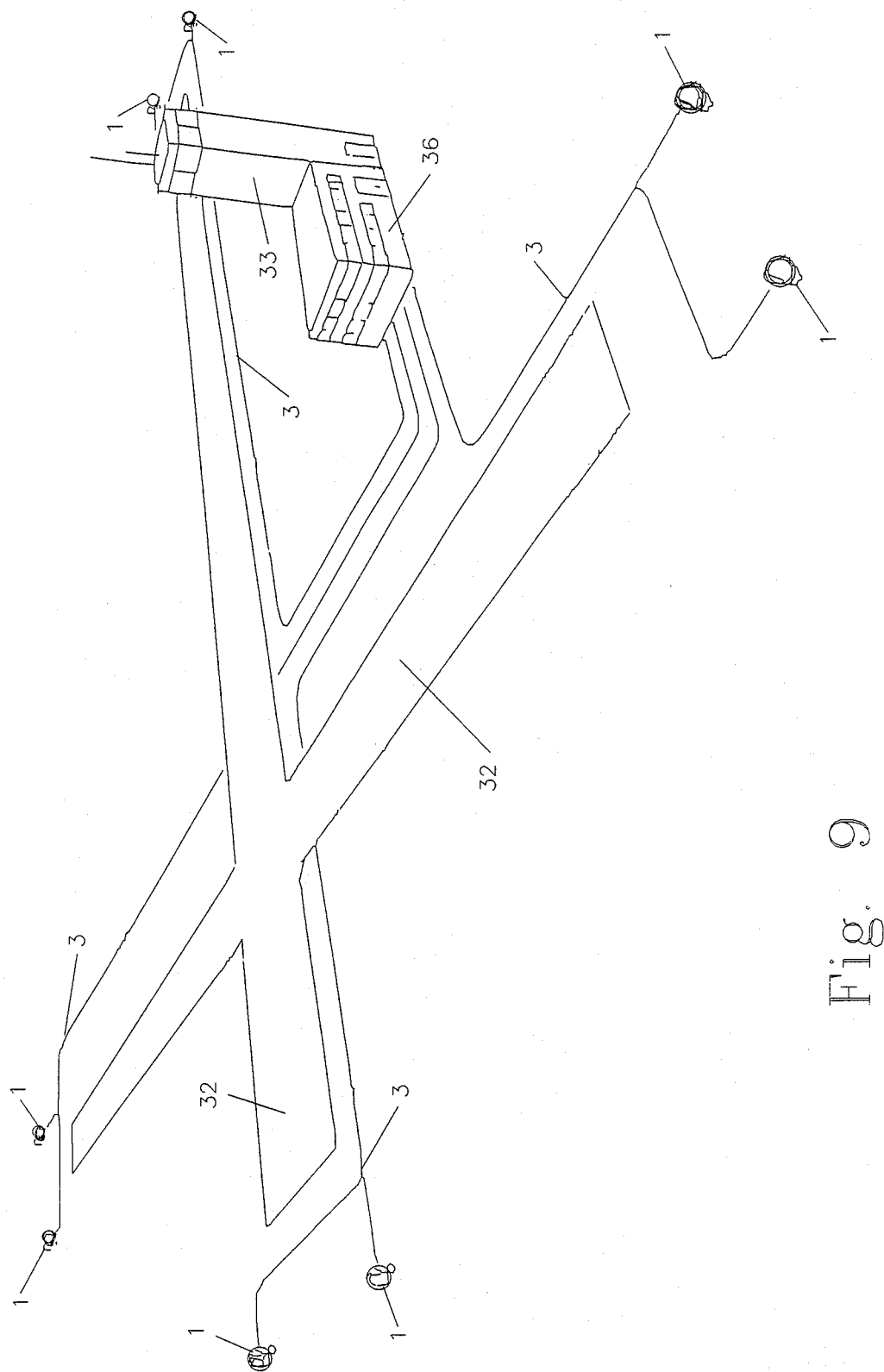
FIG. 9 is an overall view of the arrangement of a typical PARADAC airport microburst and turbulence monitor installation.

FIG. 9 shows the interaction depicted by Eq. (2). The mechanism underlying backscattering depends almost entirely on the temperature inhomogenieties in the atmosphere [ref. (2), pp. 18-3 to 18-6; ref. (3), pp. 19-1 to 19-3; ref. (5), pp. 3–5], which are carried along with the wind field.

d. Data Processing

Although the PARADAC uses separate transmitting and receiving elements, since these elements are closely colocated, the PARADAC system falls within the class of "monostatic" echo ranging systems. It transmits a pulse of energy during an interval t, then waits to receive the return echoes from this pulse. It is easy to demonstrate that the range interval resolution of the system is given by ct/2, where c is the sound speed at the scattering point. A fundamental dilemma of such systems is presented by considerations of signal to noise ratio. The signal to noise ratio of processed echoes can be increased in two direct ways: one, increasing the sound pressure level of the transmitted pulse, and two, increasing the length of the transmitted pulse. Both approaches apply more signal energy to the target area. The first approach is limited by the capabilities of transducer materials; in the PARADAC system the source level approaches the maximum feasible under existing "off the shelf" technology. This leaves increasing the total length of the transmitted pulse as one available alternative to increasing the signal to noise ratio, and hence the maximum range (height) at which the system is effective. However, increasing the pulse length decreases the range resolution of the system. Thus, as suggested above, the horns of a dilemma seem to block simultaneously long range and high resolution. One way out is to exploit coherent processing to the fullest, i.e. to average coherently the results of many ranging cycles. However, at long ranges this consumes considerable time. For example, at maximum height of 3 kilometers, the round trip travel time for a PARADAC signal approaches 18 seconds. Since one cannot expect conditions to remain constant during too many such round trips, the number of coherently processable echoes would be limited. A solution to the dilemma is found in the transmission of a pulse train known as a "pseudo-random sequence" [ref. (6)]. This is a combination of single "on" or "off" pulses, which preserves the resolution of the single pulse and at the same time, the unique identity of the pulse train. (The pseudo-random, or coded, sequences can also be sequences of pulses with phase shifts, rather than amplitude shifts.) The total sequence length, which can be many times the individual pulse length, permits the transmission of ample signal energy, which was one of the means discussed above to increase signal to noise ratio. Since these measures to increase signal to noise ratio are only necessary at long ranges, in the PARADAC system, coded sequences are used only in the "high regime"; see Table 1.

Figure 12:
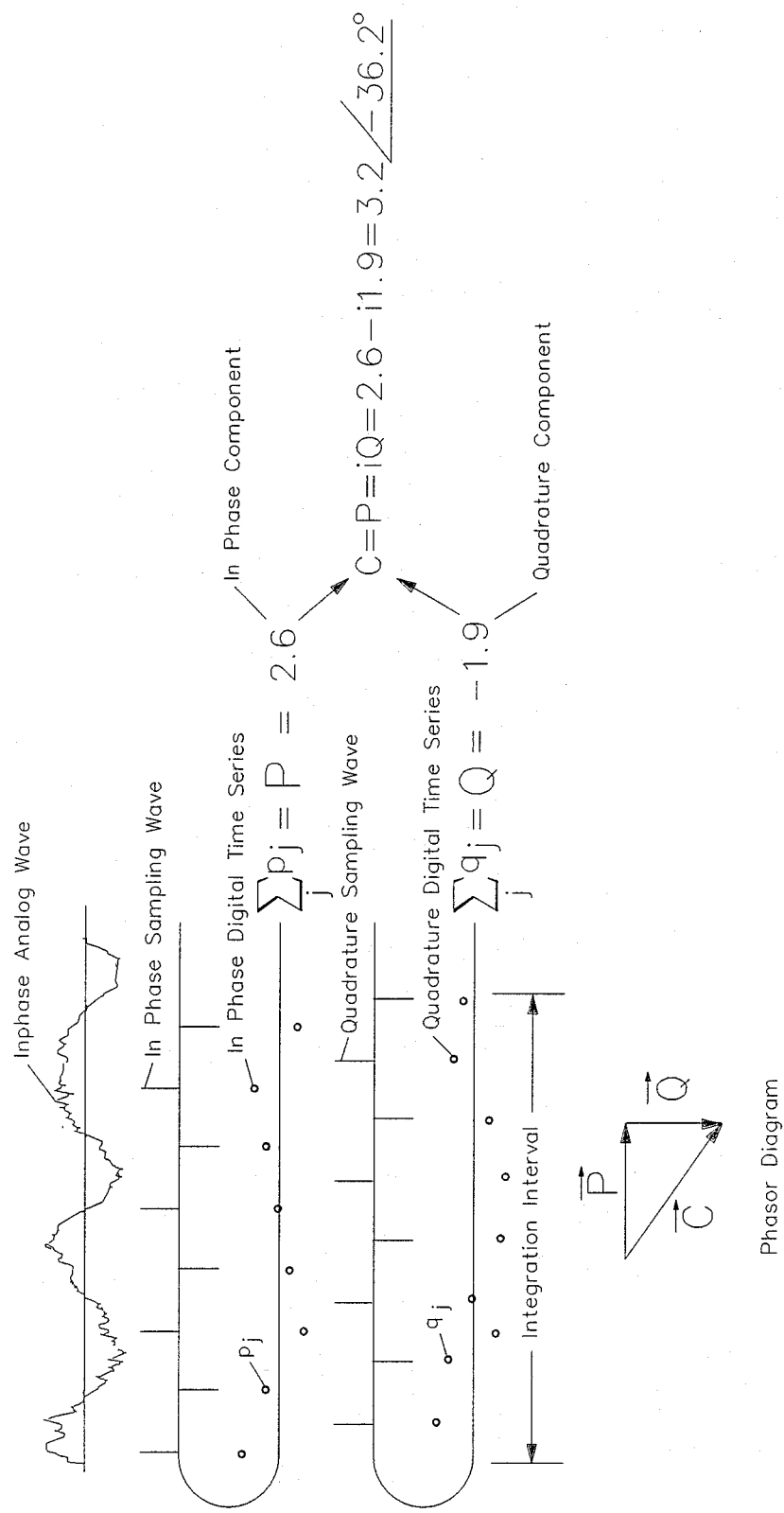
FIG. 12 graphs an illustrative example of the process of coherent demodulation.

An example of the process of digital coherent demodulation is graphically represented in FIG. 12. This process derives the in-phase and quadrature component of the detected Doppler signal directly. Coherent demodulation requires sampling the incoming signal with two alternating series of digital delta functions. The base period of each digital series matches the period of the outgoing low frequency acoustic wave. Since each of the two sampling wavetrains contains two samples per period, one positive and one negative, the Nyquist criterion is satisfied, provided the Doppler shift remains a "small" fraction of the center frequency which is the case. The two sampling wavetrains are placed in quadrature to one another. The total sampling rate is four times the acoustic center frequency (e.g., $4 \times 500 = 2,000$ samples/sec). Each element of the complex demodulate time series is a phasor and the Fourier transform of the complex demodulate time series is the Doppler spectrum. In order to remove any possibility of aliasing the Doppler spectrum by the sampling wave, the input signal is put through a band pass filter, 68 or 69, prior to the sampling process. For measuring the mean effective wind speed, we are not interested in the complete Doppler spectrum, but only in some statistical parameter associated with the spectral mean. This is measured by the PARADAC system through maintaining a running "quadrant count" of the phasor output of the coherent demodulation process. One fourth the mean quadrant rate is the effective wind Doppler in that range bin. For applications which require analysis of the complex Doppler spectrum, such as studies of turbulence, the entire complex time series of complex demodulates is subject to a Fourier transformation.

Figure 5:
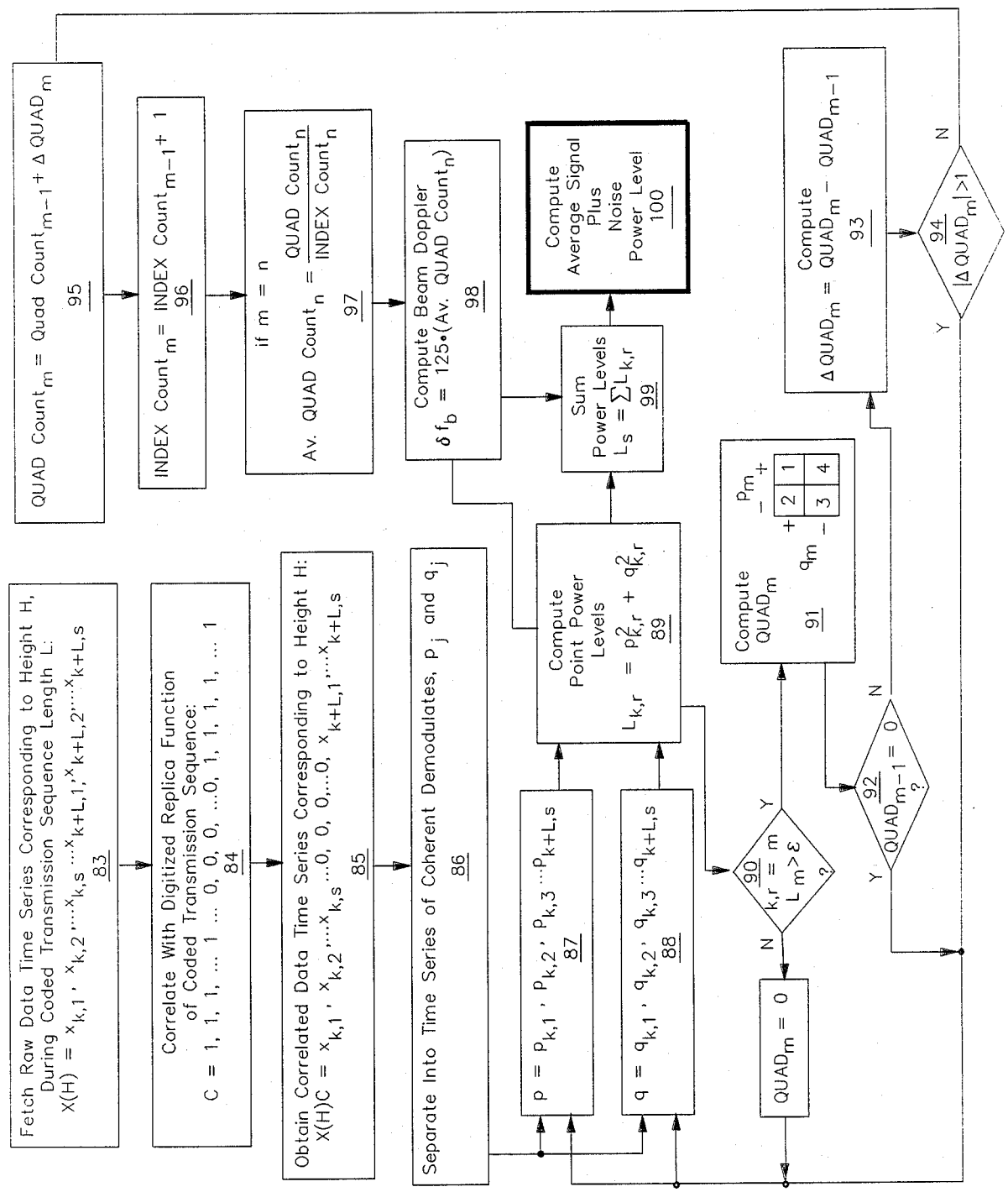
FIG. 5 shows the software process flow for converting raw received data into beam Doppler and average power levels.

PARADAC data processing for mean effective wind is illustrated in FIG. 5. This processing is normally accomplished after data are stored in RAM, as described above. The computer can either process "on line" or "off line", i.e. during a period when the system is actually engaged in the receipt of data, or when it is not. In either case, the first step is to correlate a section of the received data, suitably delayed to correspond to height (H) with a replica of the coded transmission sequence, blocks 83, 84 and 85. The correlated data stream is then separated into time series of coherent demodulates, as described above, blocks 86, 87 and 88. From the time series of coherent demodulates, the power level of each point is computed, block 89, summed, block 99, from the total, the average computed, block 100. In order to generate the quadrant count, the first step is to determine whether the point power level is greater than a predetermined threshold, block 90. If so, the quadrant is computed, block 91. If no, the system assigns the value "0" to the quadrant and addresses the next sample point, blocks 87, 88 and 89. After computation of the quadrant, the system asks whether the value of previous quadrant were "0". If so, the system addresses the next sample point. If not, the system computes the difference between the current quadrant and the previous quadrant, block 93, and asks whether this difference is greater than 1. If so, the system returns to computing the next point power level, blocks 87, 88 and 89. If no, the total quadrant count is updated, block 95. The index count is also increased by 1, block 96. When the time series index reaches the maximum number of points known to be in the series, the average quadrant count is computed by dividing the total quadrant count by the index count, block 97. Beam Doppler is then computed by multiplying average quadrant count by 125, block 98. The process shown in FIG. 5 is intended to be expository only. The actual system software may include processing algorithms to increase the computational efficiency of the process.

The output of the process described above and illustrated in FIG. 5 is "beam Doppler", that is the frequency shift of the echoes projected along a beam axis, either a canted beam axis 25 or the normal beam axis 24. This may be quickly converted into "beam wind speed", i.e. the magnitude of the wind velocity vector projected along a beam axis. Beam Doppler is identified by the letters "a", "b", "c", or "n". The first three relate to canted beams and the last refers to the normal (axial) beam. Beam wind speed, vj (j=a, b, c, n), is related to beam Doppler (fdj) by:

$$vj = -(fdj)c/2f. \tag{3}$$

The beam wind speeds are related to the orthogonal components of horizontal (V1 and V2) and vertical (V3) wind speed by the transformation:

$$V1 = (va-vb)\sin T/1.732 \tag{4a}$$

$$V2 = (2va-vb-vc)\sin T/3 \tag{4b}$$

$$V3 = (va+vb+vc)\cos T/3 \tag{4c}$$

$$V3 = vn \tag{5}$$

where T is the included angle between normal beam axis 24 and any canted beam axis 25. Note that vertical wind speed is measured in two separate and substantially independent ways: one, through Eq. (4c) above using canted beam Dopplers and two, through Eq. (5) above using normal beam Doppler. These two methods serve to check internal consistency and reliability of the measurement.

The horizontal orthogonal components of wind (V1 and V2) are taken with respect to projector array 12. In order to find the north-south (N S) and east-west (E-W) components of the horizontal wind, it is necessary to know the azmuthial orientation, B, of the reference axis (V1) of projector array 12. The transformation which yields the desired wind speeds, (VN) and (VE), is given below:

$$VN = (V1)\cos B + (V2)\sin B \quad (6a)$$

$$VE = (V1)\sin B - (V2)\cos B \quad (6b)$$

e. PARADAC Wind Measurement Examples

Two principal applications of the PARADAC system are the measurement of wind profiles and the monitoring of turbulence, particularly turbulence at airports which may endanger flight operation. The arrangement and operation of preferred embodiments of the PARADAC system for these two principal forms of wind measurement are presented below.

Figure 13A:
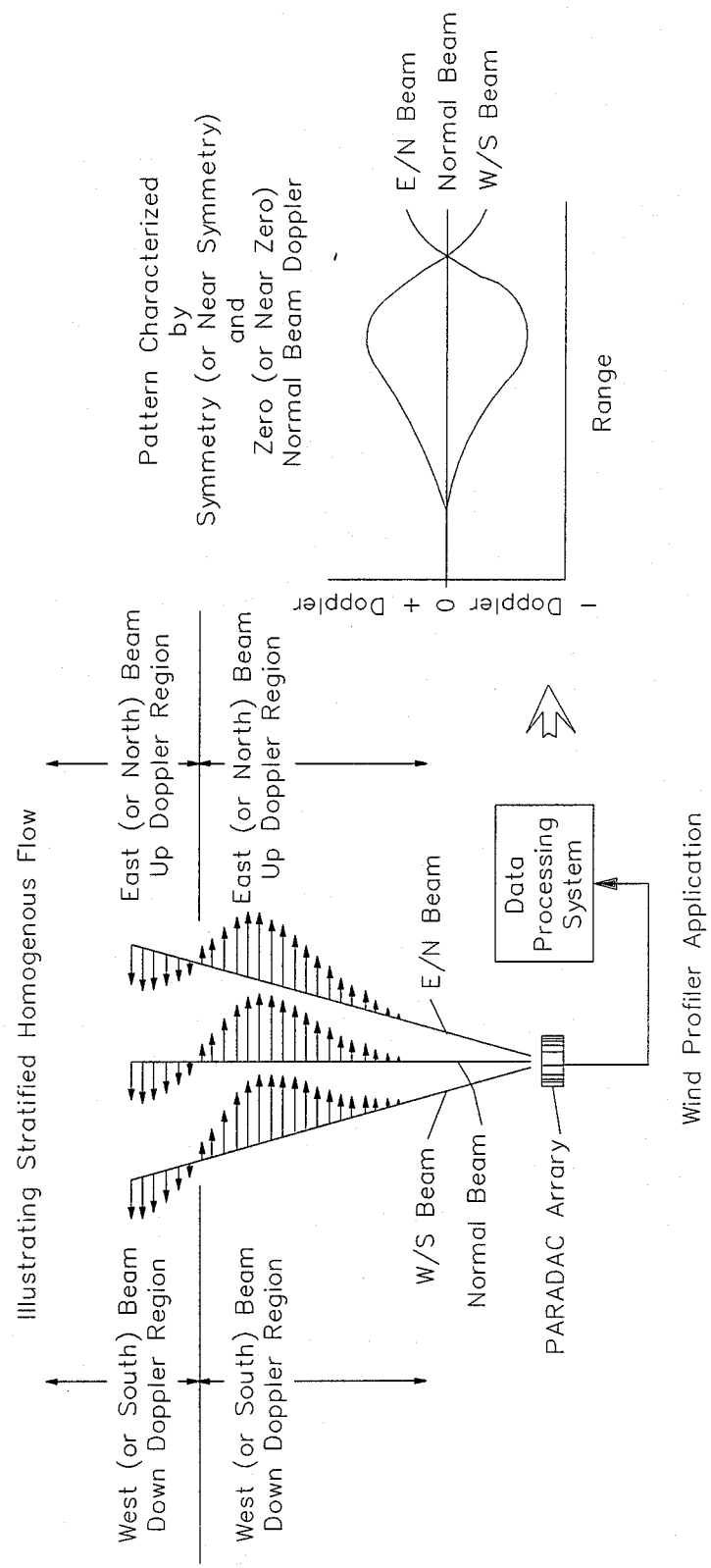
FIG. 13a and FIG. 13b compare the application of a PARADAC system as a wind profiler (FIG. 13a) and as a microburst and turbulence monitor (FIG. 13b).

FIG. 13a illustrates the use of a PARADAC system as a profiler of the mean wind. The PARADAC system shown is of a physical and electrical configuration which produces four canted beam axes 25 and one normal beam axis 24; this is the "Janus" configuration cited in Section 4 above. Three of the five propagation axes (normal, canted east and canted west) are shown; it is to be understood that another pair of axes (canted north and canted south), which are not shown, are in a plane normal to the plane of the paper. An hypothetical example of a horizontal, stratified flow is shown; it is assumed that the flow is homogeneous, or locally independent of position in a horizontal plane. This means that the speed measured by the east axis, for example, at any height will be of the same magnitude as that measured by the west axis at that height; the same is true for the north and south axes. The Doppler profiles sensed along each of the three axis are graphed in the figure. In the flow example shown, the Doppler profiles of the east and west axes are mirror images and that of the normal axis is identically zero throughout. The degree to which the spatial correlation of the mean wind in the horizontal is less than unity, the mirror symmetry of the mean east-west (or north-south) axes will be degraded. This is a valuable diagnostic tool for wind measurements of this type.

Figure 13B:
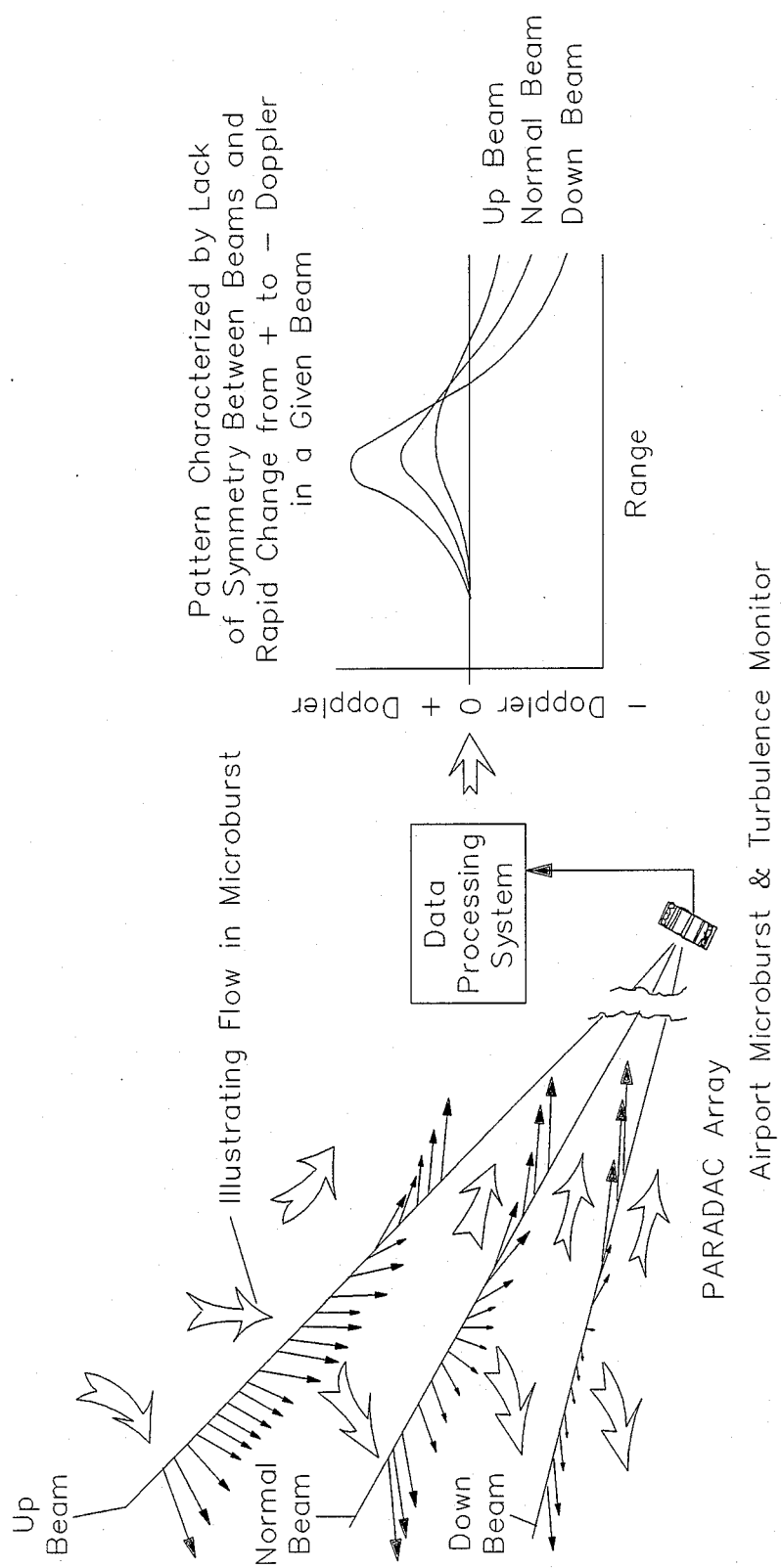

FIG. 13b illustrates the use of a PARADAC system as a microburst and turbulence sensor. A microburst is a small scale meteorological phenomenon, associated with atmospheric instability, in which an intense downdraft occurs over a small area, typically less than a half-mile in diameter. The flow associated with this downdraft converts to a divergent horizontal flow near the ground. Microbursts are very hazardous to aircraft flight operations; many accidents with loss of life have resulted from this cause. An aircraft which enters a microburst during a landing approach will first encounter a strong headwind, the normal reaction to which is to remove power; then when the plane enters the axial regions of the microburst, it will experience a downdraft and on leaving this area, it will be driven by a tailwind. The downdraft and tailwind, coming right after the possible "throttle back" caused by the initial headwind, result in a sudden loss of air speed and tend to drive the plane into the ground. PARADAC offers a means for monitoring the landing glide paths and outgoing takeoff trajectories for the onset of microbursts at airports. Another phenomenon, which is particularly dangerous for small planes, is the persistence of tip vortices which are shed from the wings, tails and control surfaces of large planes on landing. These vortices may persist for several minutes and can cause a small plane to lose control in the most critical phase of the landing operation. Under the same airport configuration, PARADAC can detect local conditions of turbulence. An hypothetical flow associated with a microburst is shown in FIG. 13b. In this case, the PARADAC projector array 12 is oriented with its normal beam axis 24 elevated to somewhere in the range of 30 to 45 degrees. For the "Janus" configuration, three sampling beams in the vertical plane now become "down", "normal" and "up". There are also two axes in a plane normal to the paper and elevated approximately the same as the normal beam axis 24; this beam configuration gives the PARADAC turbulence monitoring system extended horizontal coverage. In addition, horizontal coverage can be extended by rotation of array assembly 1 about vertical axis 11. Examples of Doppler profiles measured by each of the three beams whose axes are in the plane of the paper are shown. The microburst phenomenon would be suggested by the pattern indicated, namely, a definite wind reversal along each axis, a well defined spatial limit to the occurrence and lack of symmetry of the Doppler profiles among the three beams. Incorporated in the PARADAC signal processing system would be an optional pattern recognition module, which would be alert to the occurrence of patterns associated with microbursts and other forms of local turbulence. Should such an even occur, the PARADAC system would automatically sound an alarm.

Figure 6:
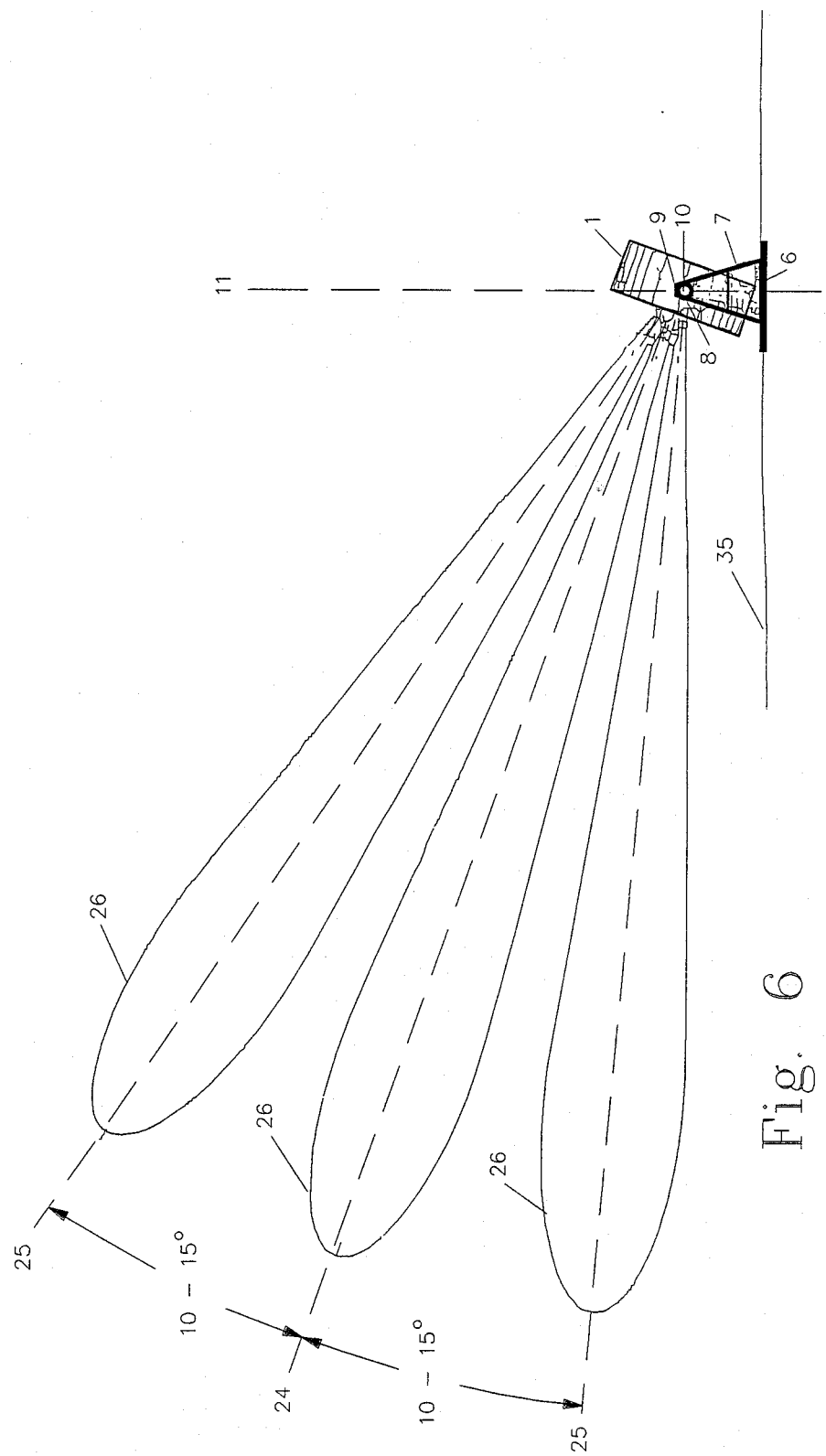
FIG. 6 shows the orientation of a PARADAC array assembly, operating as a microburst and turbulence monitor.
Figure 7:
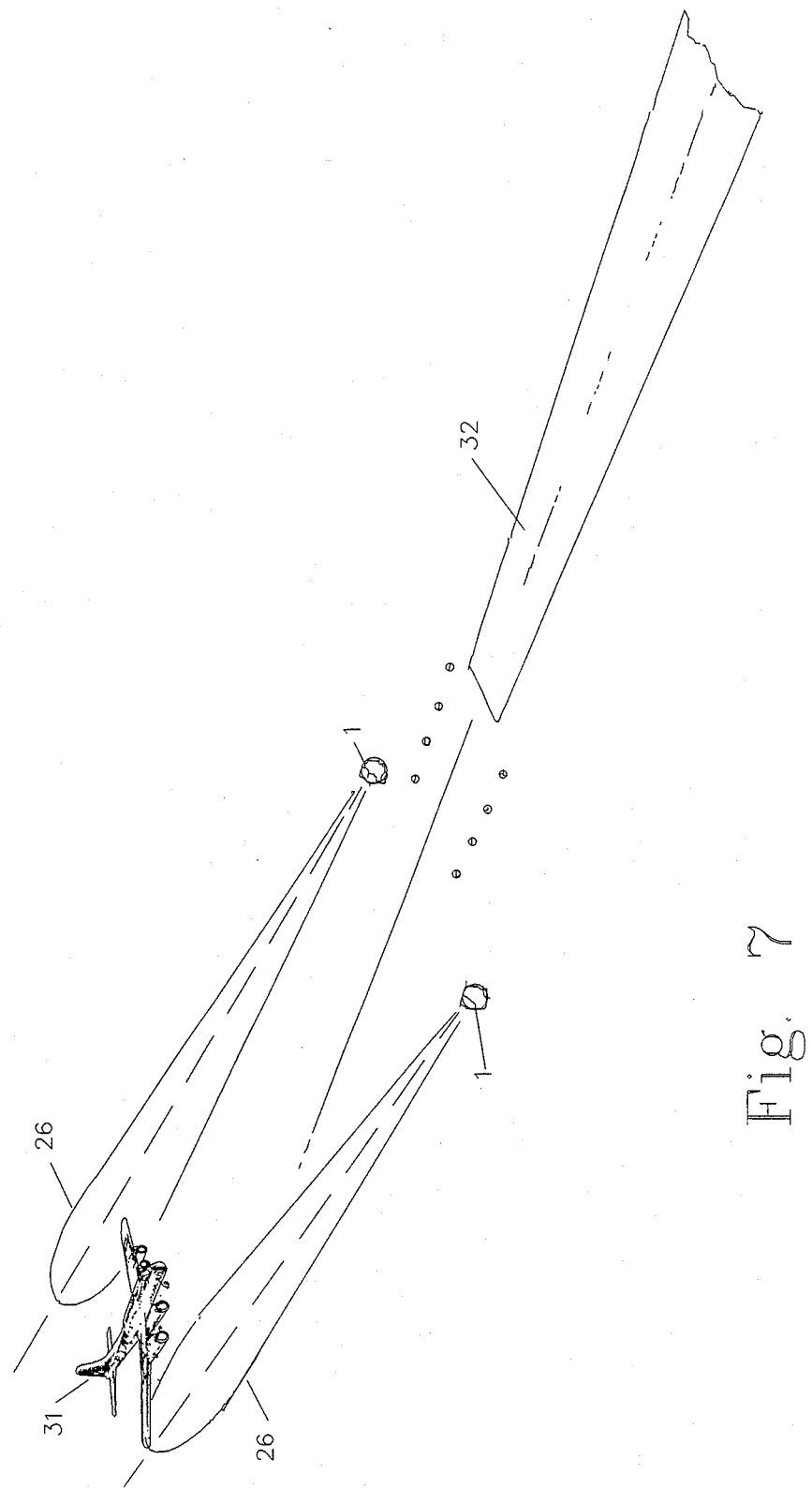
FIG. 7 illustrates part of a PARADAC airport microburst and turbulence monitor in operation.
Figure 8:
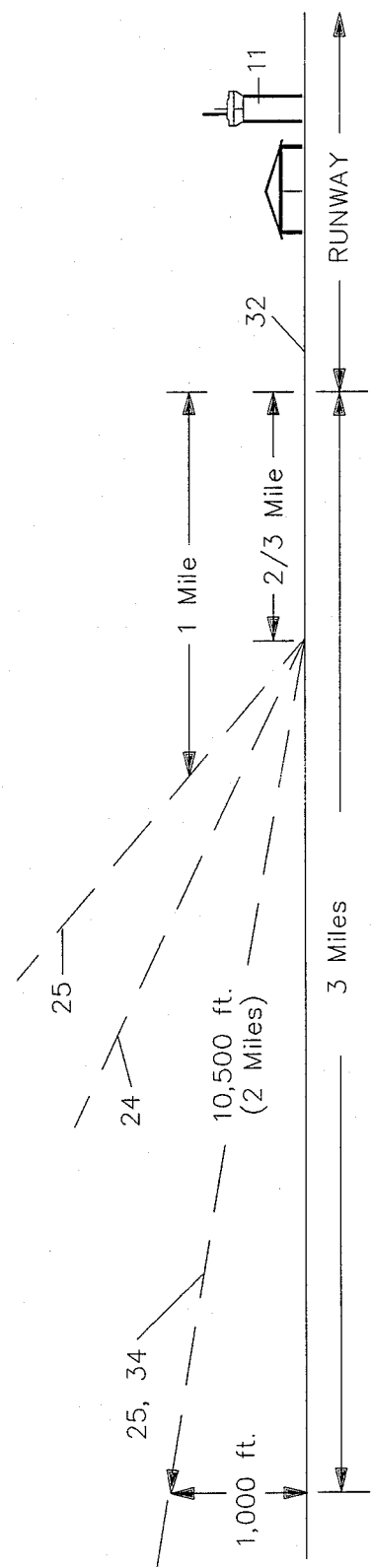
FIG. 8 shows some typical dimensions of a PARADAC airport microburst and turbulence monitor installation.

The physical arrangement of a PARADAC airport turbulence monitor (which includes monitoring for microbursts) is illustrated in FIGS. 6, 7, 8 and 9. FIG. 6 shows the profiles of array assembly 1 with the "Janus" configuration beams indicated. It is to be understood that array assembly 1, in addition to being rotatable about horizontal axis 10, is rotatable about vertical axis 11. FIG. 7 shows a typical installation where two array assemblies 1 monitor the approach glide path 34 to runway 32 for microbursts and tip vortex turbulence. Aircraft 31 is shown occupying glide path 34 in the landing process. FIG. 8 shows typical dimensions of such an installation; the PARADAC system should be able to "see" typically two miles into the glide path, where the altitude of an approaching plane would be about 1,000 feet. This is sufficiently high for the aircraft to take effective recovery action, should the presence of a microburst or other dangerous turbulence be indicated. FIG. 9 shows one concept for a complete airport PARADAC turbulence monitor installation. Two array assemblies 1 are located at either end of each runway 32. These are connected via main cable assemblies 3 to the PARADAC control and monitoring center 36 where one or more operating console assemblies 2 are located.

While preferred embodiments of this invention have been illustrated and described, variations and modifications may be apparent to those skilled in the art. Therefore, we do not wish to be limited thereto and ask that the scope and breadth of this invention be determined from the claims which follow rather than the above description.

What we claim is:

1. A method for detecting wind and wind anomalies, including the steps of:
   transmitting a plurality of primary acoustic signals of different frequencies;
   directing said primary acoustic signals as beams in directions which result in the beating of said signals in a non-linear acoustic interaction to create difference frequency signals which propagate through the atmosphere as a secondary acoustic signal extension of said primary acoustic signals;

detecting back scatter of said acoustic signals at said difference frequency; and identifying wind variations by analyzing properties of said back scattered acoustic signals.

2. A method for detecting wind and wind anomalies as defined in claim 1, wherein said step of identifying wind variations includes the further steps of extracting the Doppler intelligence from said back scattered acoustic signals and interpreting said Doppler intelligence as wind velocity and wind velocity variations as functions of location.

3. A method of detecting wind and wind anomalies as defined in claim 2, wherein said step of detecting back scattered acoustic signals includes the steps of sequentially detecting said back scattered signals from a plurality of directions and extracting wind anomaly data as a function of the different back scattered signals.

4. A method for detecting wind and wind anomalies as defined in claim 3 wherein said step of transmitting a plurality of primary acoustic signals includes the steps of transmitting first and second primary acoustic signals as beams having a difference frequency of less than 2000 Hz; and propagating an acoustic signal equal to said difference frequency as the result of the beating together of said pair of beams.

5. A method for detecting wind and wind anomalies as defined in claim 4 wherein one of said primary acoustic frequencies lies within the range from 10 kHz to 22 kHz.

6. A method for detecting wind and wind anomalies as defined in claim 4 wherein both of said ultrasonic frequencies lie within the range from 16 kHz to 22 kHz.

7. A method for detecting wind and wind anomalies as defined in claim 3 wherein the process of extracting intelligence from said back scattered acoustic signals includes the process of digital coherent demodulation.

8. A method for detecting wind and wind anomalies as defined in claim 3, including the steps of orienting at least one means for detecting back scatter in the same general azimuth and elevation as said beams.

9. A method for detecting wind and wind anomalies as defined in claim 8, including the steps of:
creating additional beams directed along different azimuths and elevations;
for each additional beam, orienting an additional means for detecting back scatter in the same general azimuth and elevation as said associated beam.

10. A method for detecting wind and wind anomalies as defined in claim 1, wherein said step of transmitting a plurality of primary acoustic signals consists of transmitting a plurality of code modulated primary high frequency acoustic signals at different frequencies.

11. A method for detecting wind and wind anomalies as defined in claim 10, wherein said code is a pseudo-random sequence.

12. A method for detecting wind and wind anomalies as defined in claim 10, wherein said process of detecting said back scattered acoustic signals at said difference frequency includes the process of cross correlating a replica of said transmitted code against said back scattered acoustic signals.

13. A method for measuring wind and wind anomalies, including the steps of:

transmitting a plurality of code modulated primary high frequency acoustic signals at different frequencies;

directing said code modulated primary high frequency acoustic signals as beams in directions which result in the beating of said signals in a non-linear acoustic interaction to create difference frequency signals which propagate through the atmosphere as an acoustic signal extension of said code modulated primary high frequency acoustic signals;

detecting back scatter of said acoustic signals at said difference frequency; and measuring and classifying the spatial structure of wind velocity and wind velocity variations by analyzing properties of said back scattered acoustic signals.

14. A method for measuring wind and wind anomalies as defined in claim 13, wherein said code is a pseudo-random sequence.

15. A method for measuring wind and wind anomalies as defined in claim 13, wherein said step of measuring and classifying the spatial structure of wind and wind variations includes the further steps of extracting the Doppler intelligence from said back scattered acoustic signals and interpreting said Doppler intelligence as wind velocity and wind velocity variations as functions of location.

16. A method of measuring wind and wind anomalies as defined in claim 14, wherein said step of detecting back scattered acoustic signals includes the steps of sequentially detecting said back scattered signals from a plurality of directions and extracting wind velocity and wind velocity anomaly data as a function of the different back scattered signals.

17. A method for measuring wind and wind anomalies as defined in claim 16 wherein said step of transmitting a plurality of code modulated primary high frequency acoustic signals includes the steps of transmitting first and second code modulated primary high frequency acoustic signals as beams having a difference frequency of less than 2000 Hz; and propagating an acoustic signal equal to said difference frequency as the result of the beating together of said pair of beams.

18. A method for measuring wind and wind anomalies as defined in claim 17 wherein the frequency value of one of said primary high frequency acoustic signals lies within the range from 10 kHz to 22 kHz.

19. A method for measuring wind and wind anomalies as defined in claim 17 wherein the frequency values of both of said primary high frequency acoustic signals lie within the range from 8 kHz to 22 kHz.

20. A method for measuring wind and wind anomalies as defined in claim 16 wherein the process of extracting intelligence from said back scattered acoustic signals includes the process of digital coherent demodulation.

21. A method for measuring wind and wind anomalies as defined in claim 17, including the steps of orienting at least one means for detecting back scatter in the same general azimuth and elevation as said beams.

22. A method for measuring wind and wind anomalies as defined in claim 21, including the steps of: creating additional beams directed along different azimuths and elevations; for each additional beam, orienting an additional means for detecting back scatter in the same general azimuth and elevation as said associated beam.

23. A method for measuring wind and wind anomalies as defined in claim 16, wherein the process of extracting intelligence from said back scattered acoustic signals includes the process of cross correlating a replica of said transmitted code against said back scattered acoustic signals.

24. A wind measurement system, comprising:
means for propagating a code modulated acoustic beam through the atmosphere;
means for receiving back scattered acoustic signals created by the interaction of the propagated acoustic energy and air currents; and
means for the digital coherent demodulation of said received acoustic signals.

25. A wind measurement system as defined in claim 24 wherein said means for propagating a code modulated acoustic beam comprises means for transmitting radiation beams at frequencies, angles and elevations which result in their mixing in the atmosphere to create said acoustic beam.

26. A wind measurement system as defined in claim 25, comprising:
means for interpreting the demodulated acoustic signal as wind velocity.

27. A wind measurement system as defined in claim 25, wherein said means for receiving said acoustic back scatter signals includes an array of microphones.

28. A wind measurement system as defined in claim 27, further comprising a parabolic reflector with said array of microphones positioned in the focal plane thereof.

29. A wind measurement system as defined in claim 28, wherein said microphone array comprises an axial beam microphone and a plurality of canted beam microphones equally spaced about said axial beam microphone.

30. A wind measurement system as defined in claim 29, wherein said means for transmitting radiation beams comprises a plurality of acoustic projectors arranged to radiate a beam comprised of narrow individual beams relatively directed to result in their non-linear interaction.

31. An apparatus as defined in claim 30, further comprising:
an analog-to-digital converter for digitizing the output of said microphones.

32. An apparatus as defined in claim 30, further comprising:
means to amplify the output of said microphones;
a plurality of signal filters for sorting the outputs of said amplifiers into different analog signals, each representing noise or information signals plus noise;
an analog-to-digital converter for digitizing the analog output signals of said signal filters; and microprocessor means for further processing of said digitized signals.

33. An apparatus as defined in claim 32 wherein said code is a pseudo-random sequence.

34. A wind measurement system, comprising:
a plurality of acoustic projectors for radiating a beam of different frequencies selected from a frequency range which will result in a difference beat frequency in the acoustic range;
a parabolic reflector;
a plurality of microphones arranged at the focus of said parabolic reflector, each of said microphones responsive to the back scatter of the difference frequency of said beam;
said acoustic projectors and microphones arranged to have related propagation and reception azimuths and elevations;
one of said microphones arranged to receive along the normal axis of said parabolic reflector, the remaining microphones arranged in reception patterns canted to the normal beam axis of said parabolic reflector;
amplifier circuit means for processing the output of each of said microphones;
gating means for regulating the output of each of said amplifier circuit means;
an analog-to-digital converter;
noise and signal discriminating filters for passing selected frequency outputs of said gate means to said analog-to digital converter;
microprocessor means for performing coherent demodulation of the output of said analog-to-digital converter;
a digital-to-analog converter responsive to said microprocessor means;
a pulse width modulator regulated by the output of said digital-to-analog converter;
a pulse width amplifier responsive to the output of said pulse width modulator for driving said acoustic projectors; and
gimballed means for supporting said high acoustic projectors, acoustic transducers and parabolic reflector whereby the array of beam and reception patterns may be aimed in selected directions.

35. A wind measurement system as defined in claim 34, comprising:
means to interpret said demodulated signals as wind measurements at a specific point in the air volume around said wind measurement system.

* * * * *